(12) United States Patent
Horstmann et al.

(10) Patent No.: US 11,827,252 B2
(45) Date of Patent: Nov. 28, 2023

(54) ELECTRICAL CONNECTING APPARATUS FOR SUPPLYING POWER TO COUPLED CARS OF A RAIL VEHICLE

(71) Applicant: HARTING Electric GmbH & Co. KG, Espelkamp (DE)

(72) Inventors: Jens Horstmann, Guangdong (CN); Albert Ferderer, Espelkamp (DE); Frank Quast, Bielefeld (DE)

(73) Assignee: HARTING ELECTRIC GMBH & CO. KG

( * ) Notice: Subject to any disclaimer, the term of this patent is extended or adjusted under 35 U.S.C. 154(b) by 1174 days.

(21) Appl. No.: 16/477,489

(22) PCT Filed: Dec. 6, 2017

(86) PCT No.: PCT/DE2017/101045
§ 371 (c)(1),
(2) Date: Jul. 11, 2019

(87) PCT Pub. No.: WO2018/130238
PCT Pub. Date: Jul. 19, 2018

(65) Prior Publication Data
US 2020/0086896 A1    Mar. 19, 2020

(30) Foreign Application Priority Data

Jan. 11, 2017 (CN) .......................... 201720032873.X

(51) Int. Cl.
*B61G 5/10* (2006.01)
*H01R 13/74* (2006.01)
(Continued)

(52) U.S. Cl.
CPC ................ *B61G 5/10* (2013.01); *B61G 1/22* (2013.01); *B61G 3/24* (2013.01); *B61G 5/06* (2013.01);
(Continued)

(58) Field of Classification Search
CPC ... B61G 5/10; B61G 5/06; B61G 7/06; B61G 7/10; B61G 3/24; B61G 1/22;
(Continued)

(56) References Cited

U.S. PATENT DOCUMENTS 4,711,510 A    12/1987    Orlando, Jr. ................... 439/246
9,192,537 B2 *  11/2015    Schlegel ................ A61B 90/14
(Continued)

FOREIGN PATENT DOCUMENTS

CN    106129646    11/2016    ............... H01R 4/28
CN    106410476 A  *  2/2017
(Continued)

OTHER PUBLICATIONS

International Preliminary Report on Patentability (w/translation) issued in application No. PCT/DE2017/101045, dated Jul. 16, 2019 (14 pgs).
(Continued)

*Primary Examiner* — S. Joseph Morano
*Assistant Examiner* — James William Jones
(74) *Attorney, Agent, or Firm* — HAYES SOLOWAY P.C.

(57) ABSTRACT

Disclosed is an electrical connecting apparatus for supplying power to cars which are coupled to one another, including a first plug-in connector to which at least one cable is connected, and a corresponding second plug-in connector which is intended to be fastened to a car wall, in particular in a vertical lateral wall. The first plug-in connector and the second plug-in connector are each provided with one or more corresponding first contact elements or second contact elements which can be plug-connected in an insertion direction (A), and the cable of the first plug-in connector exits from the first plug-in connector in a first cable outlet direction (B) which is angled away in relation to the insertion direction (A). Also disclosed is a rail vehicle having at
(Continued)

least two coupled cars, wherein each of the two coupled cars is provided with at least one electrical connecting apparatus as above described.

14 Claims, 4 Drawing Sheets

(51) Int. Cl.
*B61G 3/24* (2006.01)
*B61G 7/10* (2006.01)
*B61G 1/22* (2006.01)
*B61G 5/06* (2006.01)
*H01R 13/627* (2006.01)
*B60T 13/66* (2006.01)

(52) U.S. Cl.
CPC .............. *B61G 7/10* (2013.01); *H01R 13/748* (2013.01); *B60T 13/662* (2013.01); *B60T 13/665* (2013.01); *H01R 13/6272* (2013.01); *H01R 2201/26* (2013.01)

(58) Field of Classification Search
CPC .............. H01R 13/748; H01R 2202/26; H01R 13/6272; B60T 13/662; B60T 13/665
USPC ........................................................ 213/1.3
See application file for complete search history.

(56) References Cited

U.S. PATENT DOCUMENTS

| | | | | |
|---|---|---|---|---|
| 9,231,336 | B2 * | 1/2016 | Riepe ..................... | H01R 13/58 |
| 2007/0010135 | A1 * | 1/2007 | Ferderer .............. | H01R 4/5033 |
| | | | | 439/660 |
| 2008/0026639 | A1 * | 1/2008 | Sardi ....................... | B60L 53/16 |
| | | | | 439/607.41 |
| 2010/0140964 | A1 * | 6/2010 | Schmidt ................. | H02G 3/081 |
| | | | | 292/347 |
| 2010/0248513 | A1 * | 9/2010 | Ferderer .......... | H01R 13/62955 |
| | | | | 439/157 |

FOREIGN PATENT DOCUMENTS

| | | | | |
|---|---|---|---|---|
| CN | 108281835 A | * | 7/2018 | ............. F16B 39/24 |
| DE | 102011006887 | | 10/2012 | ............. H01R 13/46 |
| DE | 202011051250 | | 12/2012 | ............. B61G 5/10 |
| DE | 102013201125 | | 7/2014 | ............. H01R 24/38 |

OTHER PUBLICATIONS

International Search Report and Written Opinion (w/translations) issued in application No. PCT/DE2017/101045, dated Mar. 6, 2018 (16 pgs).
European Search Report issued in EPO Patent Appln. Serial No. 17822127.1, dated Jan. 21, 2022, with machine English translation, 7 pages.

* cited by examiner

ELECTRICAL CONNECTING APPARATUS FOR SUPPLYING POWER TO COUPLED CARS OF A RAIL VEHICLE

TECHNICAL FIELD

The present invention concerns an electrical connecting apparatus for supplying power to coupled cars of rail vehicles with a first plug connector, to which at least one cable is connected, and a corresponding second plug connector, which is provided for attachment to a car wall, wherein the first and second plug connectors are each equipped with one or more corresponding first or second contact elements, which can be plugged together in a plugging direction and the cable of the first plug connector emanates from the first plug connector in a first cable outlet direction.

STATE OF THE ART

In order to produce an electricity supply (power supply) for interconnected cars of a rail vehicle such as a train, electrical connecting apparatuses are disposed on mutually facing transverse walls of successive cars, by means of which an electrical connection is made between the cars by one or more cables. For this purpose, as a rule at least one stationary plug connector is disposed on each of the transverse walls, which are connected to each other via a line or a cable. The cable is equipped with plug connectors, which are complementary to the stationary plug connectors and each of which can be plugged into one of the stationary plug connectors. Due to the considerable current levels, the cables as well as the plug connectors or their contact elements must be made a suitably large size, which makes handling difficult when making the plug connection. To ensure the relative mobility of the consecutive cars, a length of the cable is made longer than a distance of the transverse walls of the cars. The cable therefore hangs downwards due to its weight, which means that a pulling force along the cable acts on the plug connector provided by the connecting apparatus.

Since the required cables as well as the known plug connectors are comparatively voluminous and heavy, handling is difficult when establishing the plug connection. In particular, in order to counteract a buckling load on the plug connector due to the hanging lines, known plug connectors are usually plugged in along the cable outlet direction obliquely in relation to a vertical direction. The pulling force on the plug connector caused by the hanging cable can therefore cause the connected plug connectors to be pulled apart in the plugging direction due to the forces acting along the cable. When establishing the plug connection, a user must therefore apply considerable effort while simultaneously holding and locking the plug connector, which is difficult to coordinate. As a rule, it is therefore not possible or hardly possible for one user alone to establish the plug connection without assistance. Last but not least, the individual phases of the power supply for known plug connectors are disposed in a common plug connector, i.e. 4 cables to a plug connector for example, whereby handling continues to be difficult due to the comparatively stiff and heavy cables.

Against this background, it is the object of the invention to provide an electrical connecting apparatus of the type mentioned at the outset, which facilitates the handling of the plug connectors of the connecting apparatus when plugged together, in particular enabling a plug connection to be established by a user on their own. In addition, the reliability of the connection device is to be improved by reducing the load on the plug connector at the cable outlet according to the requirements.

TECHNICAL SOLUTION

The stated object is achieved by an electrical connecting apparatus for the power supply of interconnected cars of rail vehicles, in particular cars of a train, in accordance with the present invention. The electrical connecting apparatus for powering interconnected cars includes a first plug connector, to which at least one cable is connected, and a corresponding second plug connector, which is provided for fastening to a wall of a car, especially to a vertical transverse wall. The first and second plug connectors are each equipped with one or more corresponding first or second contact elements, which can be plugged together in a plugging direction, and the cable of the first plug connector emanates from the first plug connector in a cable outlet direction. The first cable outlet direction is angled opposite to the plugging direction.

In this case, the first cable outlet direction refers to the direction in which the cable emanates from a housing of the first plug connector, for example. The first cable direction thus also denotes a direction of a force action on the first plug connector that is exerted by a pulling force along the cable. The complementary contact elements of the first and second plug connectors are oriented in the plugging direction at least in a plug-in region. By angling the plug-in direction relative to the first cable outlet direction, it is possible to avoid a pulling force along the cable resulting in pulling the first plug connector from the second plug connectors. The first plug connector can therefore be provisionally plugged together with the second plug connector without any problems, wherein pulling forces acting along the cable are absorbed and dissipated by the second plug connector without the risk of pulling apart the provisionally connected plug connectors. Since the relevant pulling forces act along the cable, i.e. in the first cable outlet direction, at an angle to the plugging direction, a holding device can preferably be provided for provisionally securing the first plug connector on the second plug connector. The holding device is preferably designed in such a way that the first plug connector is supported against forces acting in the first cable outlet direction when plugged together with the second plug connector. The support is preferably carried out in such a way that plugging together in the plugging direction is not hindered by the holding device or is only slightly hindered. The holding device preferably includes complementary holding means on the first and second plug connectors, which work together during plugging together and in a provisionally plugged-in state, at least until final locking of the plug connector is performed. Depending on the requirements, a latching device may also be provided, which allows provisional latching of the first plug connector and the second plug connector in the plugging direction during plugging together in order to counteract separating forces acting in the plugging direction. In preferred embodiments, the aforementioned holding device and the latching device can comprise common components.

The angled orientation of the plugging direction to the first cable outlet direction also has the advantage that even pulling forces on the cable that do not act along the cable cannot or can hardly release the plug connection, since due to the angled cable outlet the resulting forces make pulling apart difficult due to the forces not acting coaxially to the plugging direction. The aforementioned holding device can be designed in such a way that the holding means is wedged due to the pulling force components acting in parallel but not coaxially to the plugging direction in this case, which prevents pulling apart in the plugging direction.

In particular, the first cable outlet direction may be angled at an angle greater than 45 degrees relative to the plugging direction, but the first cable outlet direction is preferably angled perpendicularly to the plugging direction. It can thereby be achieved that no component of a force action has an effect along the cable in the plugging direction, i.e. no force component acts in the plugging direction. When establishing the plug connection, the first plug connector and the second plug connector can be plugged together without a pulling force along the cable, for example due to its weight, being able to pull the first plug connector off the second plug connector. The plug connection can therefore be maintained without manipulation by a user without locking having been established or the locking can be established without a user having to prevent the first plug connector from being pulled away at the same time. Last but not least, due to the perpendicularly angled arrangement of the plugging direction to the first cable outlet direction, the entire connecting apparatus can also be made relatively compact, which means that less space is required in the assembled state.

In a preferred embodiment of the electrical connecting apparatus, one or more cables can also be connected to the second plug connector, which emanate from it in a second cable outlet direction. In this case, the second cable outlet direction of the cables of the second plug connector is also preferably angled relative to the plug connector. In particular, the second cable outlet direction is also angled perpendicularly to the plugging direction. This allows the first and second cable outlet directions to be in the same direction, enabling a 180° reversal of the cable feed or power feed in the interconnected state of the connecting apparatus (the cable of the second plug connector relative to the cable of the first connector), which, among other things, allows a compact design of the connecting device.

The electrical connecting apparatus is preferably designed in such a way that the first cable outlet direction in a plugged-together state of the first and second plug connectors is oriented parallel or almost parallel to a fastening plane, in which the second plug connector is provided for attachment to a car wall. The fastening plane is preferably oriented essentially parallel to an assembly surface. Especially with a vertical alignment of the fastening plane, due to the angled plugging direction the pulling forces acting along the cable can be optimally dissipated in this way, for example via an optional holding device, which supports the first plug connector on the second plug connector against forces in the direction of the cable outlet direction. In this case, the cable can thus be virtually suspended on the second plug connector by means of the first plug connector when the plug connection is established and before locking by means of the holding device. The almost parallel or parallel alignment of the first cable outlet direction also allows a compact arrangement of the connecting apparatus on the car. This can be particularly advantageous if cables are connected to the second plug connector that emanate from the second plug connector in the second cable outlet direction, and as described above the second cable outlet direction is also oriented parallel or almost parallel to the fastening plane or the first cable outlet direction.

Preferably, the electrical connecting apparatus includes a locking device with which the first plug connector can be locked on the second plug connector in a plugged-in state. The locking device can be designed as a locking lever, for example on the first plug connector, which intervenes for locking, for example, by engaging the lever with engagement means into corresponding engagement means on the second plug connector. The locking device is preferably a screw device, which allows the first plug connector to be screwed to the second plug connector. For example, a threaded sleeve of the first plug connector can be screwed to a thread of the second plug connector. Preferably, however, the screw device allows the direct screwing of a housing of the first plug connector onto a housing of the second plug connector. For example, the screw device can provide a screw connection at four points. Preferably, however, the screw connection only includes a diagonal screw connection at 2 points.

With the electrical connecting apparatus in a mounted state, the second plug connector is preferably provided for attachment to the car wall in such a way that the plugging direction is essentially horizontal, and the first cable outlet direction is essentially directed vertically downwards. In this case, a fastening plane of the second plug connector is preferably oriented essentially vertically. The horizontal direction as well as the vertical direction are defined by the direction of the gravitational force. In this case, the first plug connector can be easily plugged together with the second plug connector without the hanging cable being able to pull the first plug connector off.

In a preferred embodiment, the second plug connector is designed as an integral assembly unit for connecting a plurality of especially similar first plug connectors. An integral assembly unit refers, for example, to the placement of the components of the second plug connector in a common housing. In this case, the second plug connector comprises a plurality of contact bushes as second contact elements, for example, each of which is embodied for plugging in a first contact element of a first plug connector, which is embodied as a contact pin, for example. In this case, the second plug connector is designed in such a way that the plurality of first plug connectors can be disposed horizontally juxtaposed and plugged together with the second plug connector.

In principle, the plurality of first plug connectors can also be embodied as an integral plug connector. However, there is preferably a plurality of separate first plug connectors, which can be plugged together with the second plug connector separately and can be locked separately thereto. For example, a single first plug connector can be provided for each phase of the power supply, which is fitted with a cable for supplying power for the corresponding phase. This allows the handling of the connection device to be further simplified, since when establishing the plug connection only one first plug connector with a comparatively small size and only one connected cable at a time have to be plugged in and locked.

In a preferred embodiment, the second plug connector includes at least one fastening element for attaching the second plug connector to an assembly surface of a car wall. While the fastening means can provide a simple screw connection, by means of which, for example, a housing of the second plug connector can be screwed directly to an assembly surface, for example a transverse wall of the car, the fastening element preferably comprises an assembly profile with which the housing of the second plug connector can be fastened at a distance from the assembly surface and preferably parallel thereto. The assembly profile can be designed in such a way that the distance is sufficient, for example, to feed cables out between the housing of the second plug connector and the assembly surface to the transverse wall of the car. In addition, the assembly profile can be designed in such a way that the fastening plane of the second plug connector and thus, for example, the plugging direction can be oriented relative to the assembly surface. Preferably, the fastening plane is oriented parallel to the assembly surface.

The present invention also concerns a rail vehicle, comprising at least two coupled cars, each of which is equipped with at least one of the electrical connecting apparatuses described here. A second plug connector is attached to a car wall on each of the paired cars. In each case, a first plug connector is plugged together with the second plug connectors, wherein the first plug connectors are connected to each other by the connected cable. The car walls are preferably mutually facing transverse walls of the coupled cars and the first cable outlet directions of the first plug connectors are preferably mainly oriented vertically downwards. The plugging directions of the two electrical connecting apparatuses are preferably mainly oriented horizontally.

An exemplary embodiment of the electrical connecting apparatus according to the present invention is described below using figures.

BRIEF DESCRIPTION OF THE FIGURES

The figures show schematically.

The same reference characters generally denote the same or similar components, unless otherwise noted.

EMBODIMENTS

Figure 1:
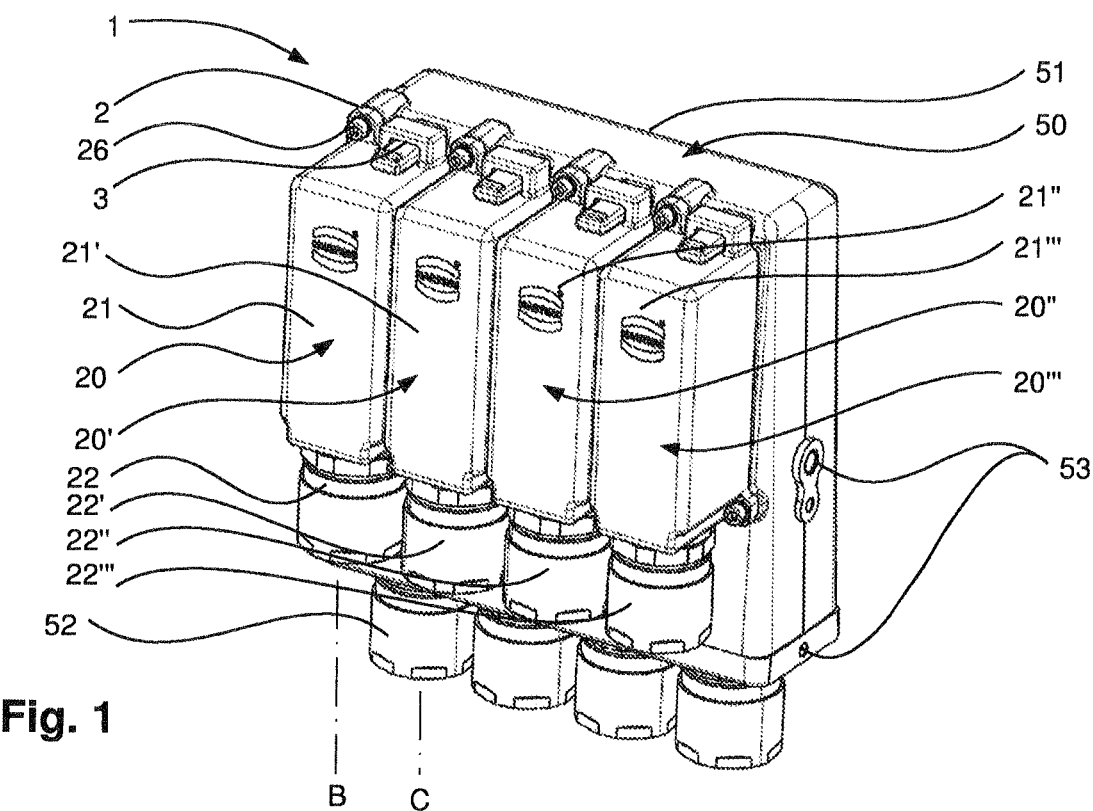
FIG. 1: shows an electrical connecting apparatus according to the present invention in an exterior view.

FIG. 1 shows an electrical connecting apparatus 1 according to the present invention in an external view. Four first plug connectors 20, 20', 20", 20'" are plugged together with a second plug connector 50 embodied as an integral unit. The first plug connectors 20, 20', 20", 20'" are connected to a connection side 65 of the second plug connector 50 in the connected state. The first plug connectors 20, 20', 20", 20'" are essentially embodied in the same way and each comprises a separate housing 21, 21', 21", 21'" on which electromagnetically compatible (EMC) cable screw connections 22, 22', 22", 22'", each for connecting a cable (not shown), are disposed in a cable outlet direction (B). Since the first plug connectors 20, 20', 20", 20'" are essentially identical, only the first plug connector 20 is described in detail below.

The housing 21 of the first plug connector 20 is tightly screwed to a housing 51 of the second plug connector 50 by means of a screw connection serving as a locking device 2. Furthermore, there is an optional holding device 3, which includes a latching device in the present case, which provisionally secures the first plug connector 20 against pulling off when plugged together with the second plug connector 50 before locking is established by means of the locking device 2 (see below). The housings 21 and 51 are in electrically conductive contact to ensure sufficient shielding.

The housing 51 of the second plug connector 50 has attachment elements 53 for attachment to an assembly profile (not shown). Furthermore, the housing 51 of the second plug connector 50 comprises four EMC cable screw connectors 52 in a second cable outlet direction C, each for connecting a cable (not shown). In the plugged-together state of the first plug connector 20 and the second plug connector 50 as shown in FIG. 1, the first and second cable outlet lines B and C are oriented parallel to each other. The first and second cable outlet lines B and C are also oriented parallel to a fastening plane E of the second plug connector 50. In the present case, the fastening plane E is defined as a main plane of the second plug connector 50, to which the connection side 65 is largely oriented in parallel. The fastening plane E is usually essentially oriented parallel to an assembly surface on which the second plug connector 50 is mounted in the operational state (not shown). In the present case, the connecting apparatus 1 is described using a vertical orientation of the fastening plane E, wherein the cable outlet directions B and C are also oriented vertically and downwards.

Figure 2:
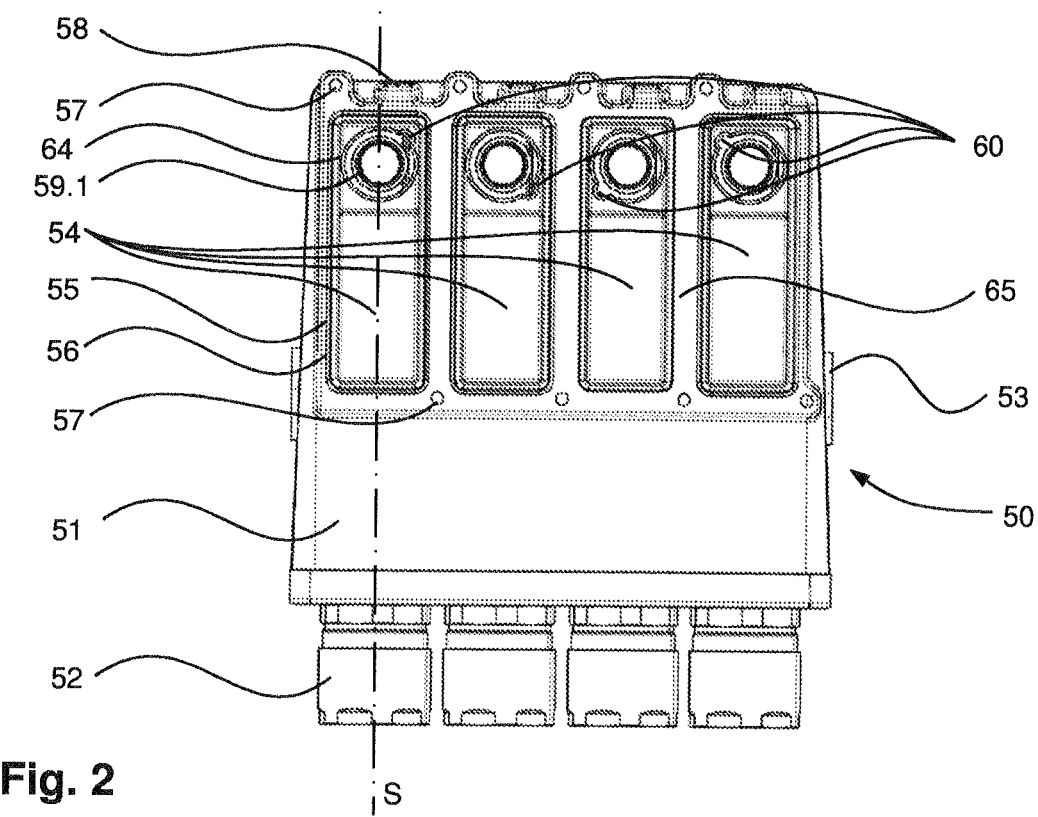
FIG. 2: shows a frontal view of a connection side of a second plug connector of the electrical connecting apparatus of FIG. 1.

FIG. 2 shows a frontal view of the connection side 65 of the second plug connector 50. The housing 51 comprises four connecting sockets 54 on the connection side 65, each for a first plug connector 20. The connecting sockets 54 are essentially disposed in a plane parallel to the fastening plane E. Each connecting socket 54 has a socket edge 55, which is enclosed in a plugged-together state by a connector edge 25 of the housing 21 of the first plug connector 20. The connector edge 25 bounds a connection opening 34 of the first plug connector 20. At the socket edge 55, an external peripheral seal 56 is provided that is tightly clamped in the plugged-together state between the socket edge 55 and the connector edge 25 and the connection opening 34 of the housing 21 is sealed against the outside of the housing 51 (see also FIG. 3).

Within the socket edge 55, an access opening 64 is disposed in an upper region, through which an essentially circular cylindrical contact bush 59.1 is accessible inside the second plug connector 50. The contact bush 59.1 is provided for plugging in a corresponding contact pin 29.1 of the first plug connector 20. A cylinder axis of the contact bush 59.1 defines a plugging direction A that is oriented vertically to the fastening plane E. The plugging direction A is also oriented perpendicularly to the first cable outlet direction B and the second cable outlet direction C.

The contact pin 29.1 and the contact bush 59.1 form components of a first contact element 29 of the first plug connector 20 or a second contact element 59 of the second plug connector 50 of the connecting apparatus 1.

Differently embodied coding elements 60 that only allow the insertion of a first plug connector 20 intended for the respective contact bush 59.1 are disposed at the access opening 64. In the present case, the coding elements 60 are embodied as indentations that are disposed at different positions on a range of the access openings 64. One of the four cable screw connectors 52 is suitably disposed at the bottom of the housing 51 for each of the four connecting sockets 54.

The housing 51 also comprises threaded bores 57 for locking screws 26, which together provide the screw connection 2 of the locking device. In addition, above the connecting socket 54 there is an optional latching arm 58 protruding in the plugging direction A, which in a plugged-together state works together as a holding device 3 with an also optional latching lug 28 of the first plug connector 20, in particular while establishing the plug connection. The first plug connector 20 can be suspended on the latching arm 58 by means of the latching lug 28 in the provisionally plugged-in state, allowing any pulling forces in the cable outlet direction B to be dissipated via the housing 51 of the second plug connector 50 to the housing 21 of the first plug connector 20. The first plug connector 20 can thus be suspended in a provisionally plugged-in state on the second plug connector 50 and can be moved in the plugging direction A, so that the first plug connector 20 and the second plug connector 50 can easily be plugged together and locking 2 can be established, which finally secures the plug connector. The latching arm 58 may have a detent 58.1 that acts as an additional latching device and prevents the first plug connector 20 or its detent 28 from being withdrawn from the latching arm 58 in the plugging direction A.

Figure 3:
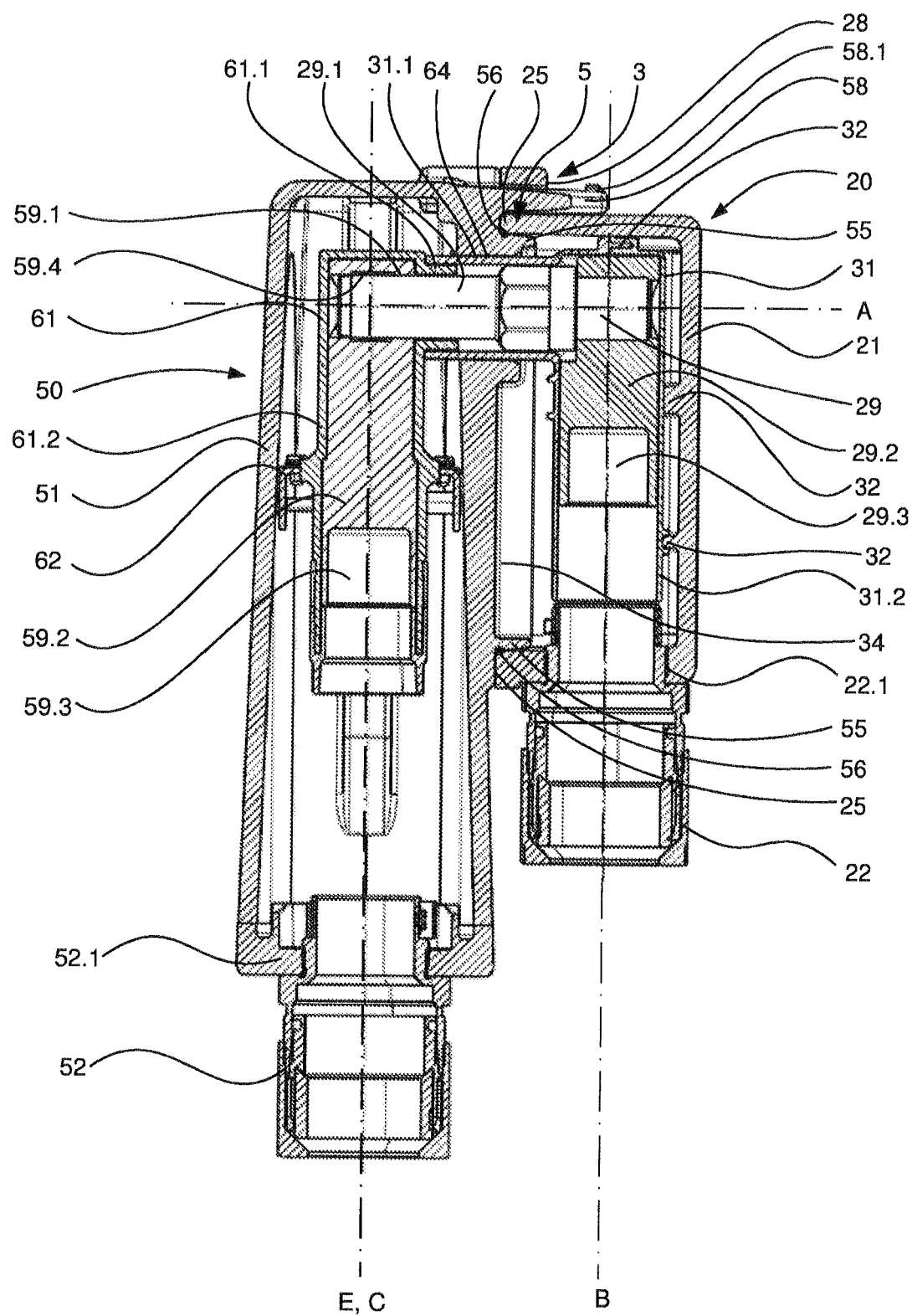
FIG. 3: shows a sectional view through the connecting apparatus of FIG. 1 in a section plane S.

FIG. 3 shows a sectional view through the plug connector device 1 in a section plane S as shown in FIG. 2. The section plane S is arranged perpendicularly to the fastening plane E and parallel to the cable outlet directions B and C. The plugging direction A is thus disposed parallel to or in the section plane S.

The housing 21 of the first plug connector 20 is elongated in the section plane S, with a longitudinal direction corresponding to the cable outlet direction B. The contact pin 29.1 of the first plug connector 20 protrudes sideways from the housing 21 through the connection opening 34 in the plugging direction A. The contact pin 29.1 is disposed coaxially partly within an insulating sleeve 31.1 of an insulating body 31, which is also oriented along the plugging direction A. The insulating sleeve 31.1 protrudes so far in the plugging direction A from the plug connector 20 that in a plugged-together state there is an overlap with a corresponding insulating sleeve 61.1 of an insulating body 61 of the second plug connector 50 (see below).

The insulating body 31 has a largely tubular section 31.2 within the housing 21 and oriented along the cable outlet direction B. The power-carrying components of the plug connector 20 are guided in the insulating body 31 and electrically insulated with respect to the housing 21.

Within the insulating body 31, the contact pin 29.1 is electrically conductively connected to a connecting element 29.2 of the contact element 29 at right angles. The connecting element 29.2 is disposed along the cable outlet direction B in the tubular section 31.2 of the insulating body 31. The contact pin 29.1 is inserted into a bore of the connecting element 29.2 at right-angles to the cable outlet direction B. A cable (not shown) that is connected via the first cable screw connection 22 to the first plug connector 20 is electrically conductively connected within the insulating body 31 to the connecting element 29.2 in the direction of the first cable outlet direction B. The connecting element 29.2 comprises a crimping region 29.3 for this. The insulating body 31 is fixed within housing 21 via latches 32. The first cable screw connection 22 is screwed with an external thread 22.1 directly into an inner thread of a corresponding access opening of the housing 21.

The housing 51 of the second plug connector 50 is elongated in the section plane S, with a longitudinal direction corresponding to the cable outlet direction C and in the fastening plane E. On the side, in the plugging direction A, the housing 51 has an access opening 64 through which the contact pin 29.1 of the first plug connector 20 is plugged into the contact bush 59.1 of the second contact element 59. The access opening 64 is dimensioned such that the insulating sleeve 31.1 of the insulating body 31 can protrude into the housing 51. The contact bush 59.1 is embodied as a lateral hole in a connecting element 59.2 of the second contact element 59. The bore forming the contact bush 59.1 is formed in the connecting element 59.2 at right angles to the cable outlet direction C and in the plugging direction A. In the contact bush 59.1, a sprung contact ring 59.4 is disposed in a peripheral internal recess that ensures a peripheral electrically conductive contact between the contact pin 29.1 and the contact bush 59.1.

The contact element 59 is disposed within an insulating body 61 of the second plug connector 50, which electrically insulates the power-carrying components relative to the housing 51. The insulating body 61 is attached to the housing 51 on the inside via retaining plates 62. The insulating body 61 has a tubular section 61.2, which is disposed coaxially to the cable outlet direction C. In the vicinity of the contact bush 59.1, the insulating body 61 has an insulating sleeve 61.1, which protrudes from the tubular section 61.2 to the access opening 64 coaxially to the plugging direction A, i.e. at right angles to the cable outlet direction C. The insulating sleeve 61.1 is enclosed by the insulating sleeve 31.1 of the first plug connector 20 in the plugged-together state, while the insulating sleeve 61.1 encloses the contact pin 29.1.

A cable (not shown) that is connected to the second plug connector 50 by means of the second cable screw connection 52 is electrically conductively connected within the insulating body 61 to the connecting element 59.2 in the direction of the second cable outlet direction C. The connecting element 59.2 has a crimping region 59.3 for this purpose. The second cable screw connection 52 is screwed with an outer thread 52.1 directly into an inner thread of a corresponding access opening of the housing 51.

In a provisionally plugged-in state, i.e. before locking 2 has been established, the first plug connector 20 is supported by means of the housing 21 thereof on the housing 51 of the second plug connector 50 in such a way that any pulling forces, for example along the cable outlet direction B, can be dissipated via the housing 51. For this purpose, the first plug connector 20 is supported on the socket edge 55 by the connector edge 25 in the present case. The connector edge 25 together with the socket edge 55 thus form another holding device 5 in the present sense. In addition, the first plug connector 20 is additionally suspended on the housing 51 of the second plug connector 50 via the holding device 3, i.e. the latching lug 28 and the latching arm 58. It is understood that there are numerous other possibilities for the design of a safety device that supports the first plug connector 20 on the second plug connector 50 in the first cable outlet direction B in a provisionally plugged-in state.

Figure 4:
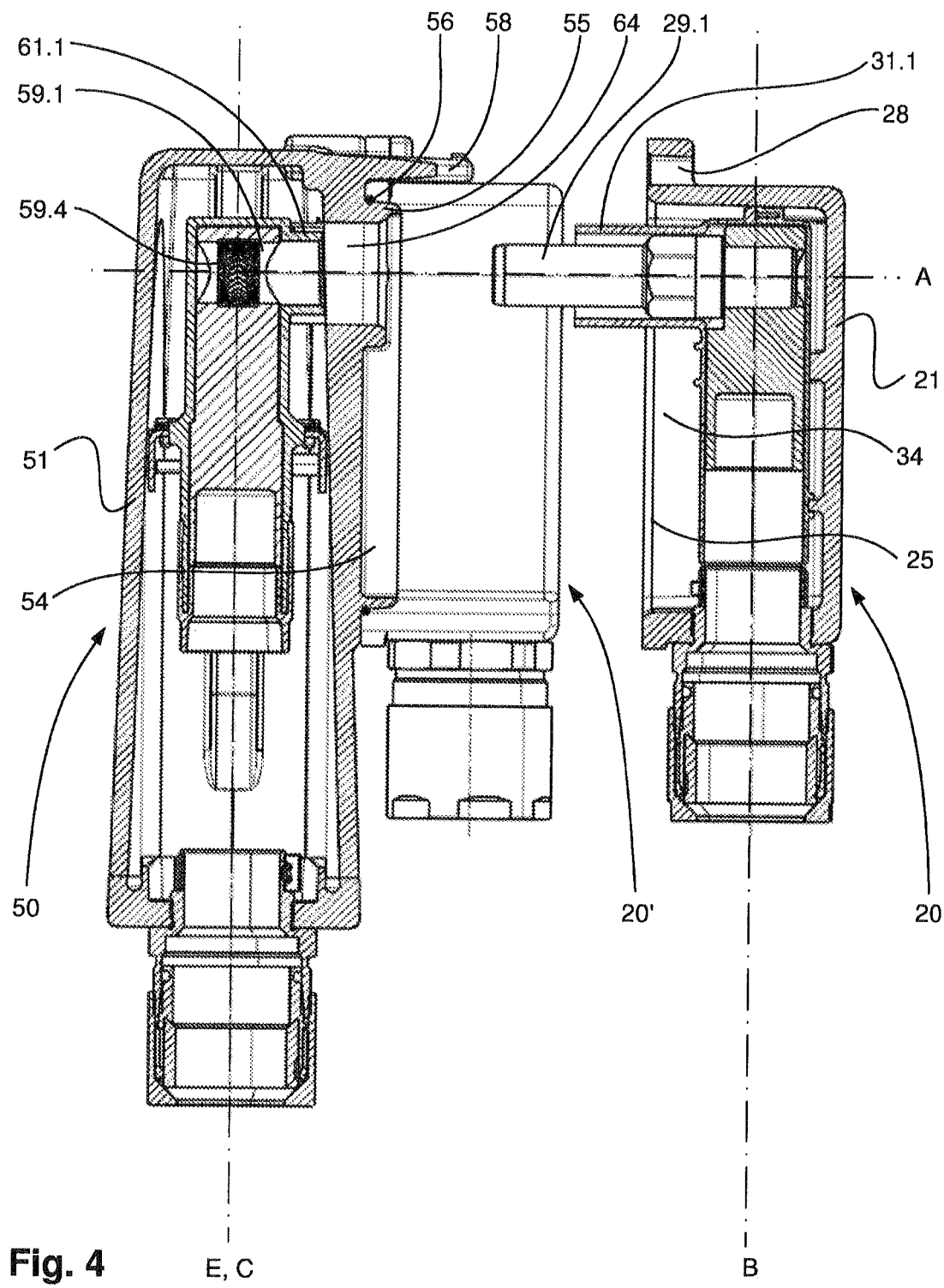
FIG. 4: shows a sectional view in the section plane S of a first plug connector and the second plug connector in the unassembled state.

FIG. 4 shows the first plug connector 20 and the second plug connector 50 in the disconnected state. For a description of the components refer to the description of FIG. 3. In the background in FIG. 4, the other first plug connector 20' that is plugged together with the second plug connector 50 can be recognized.

Figure 5:
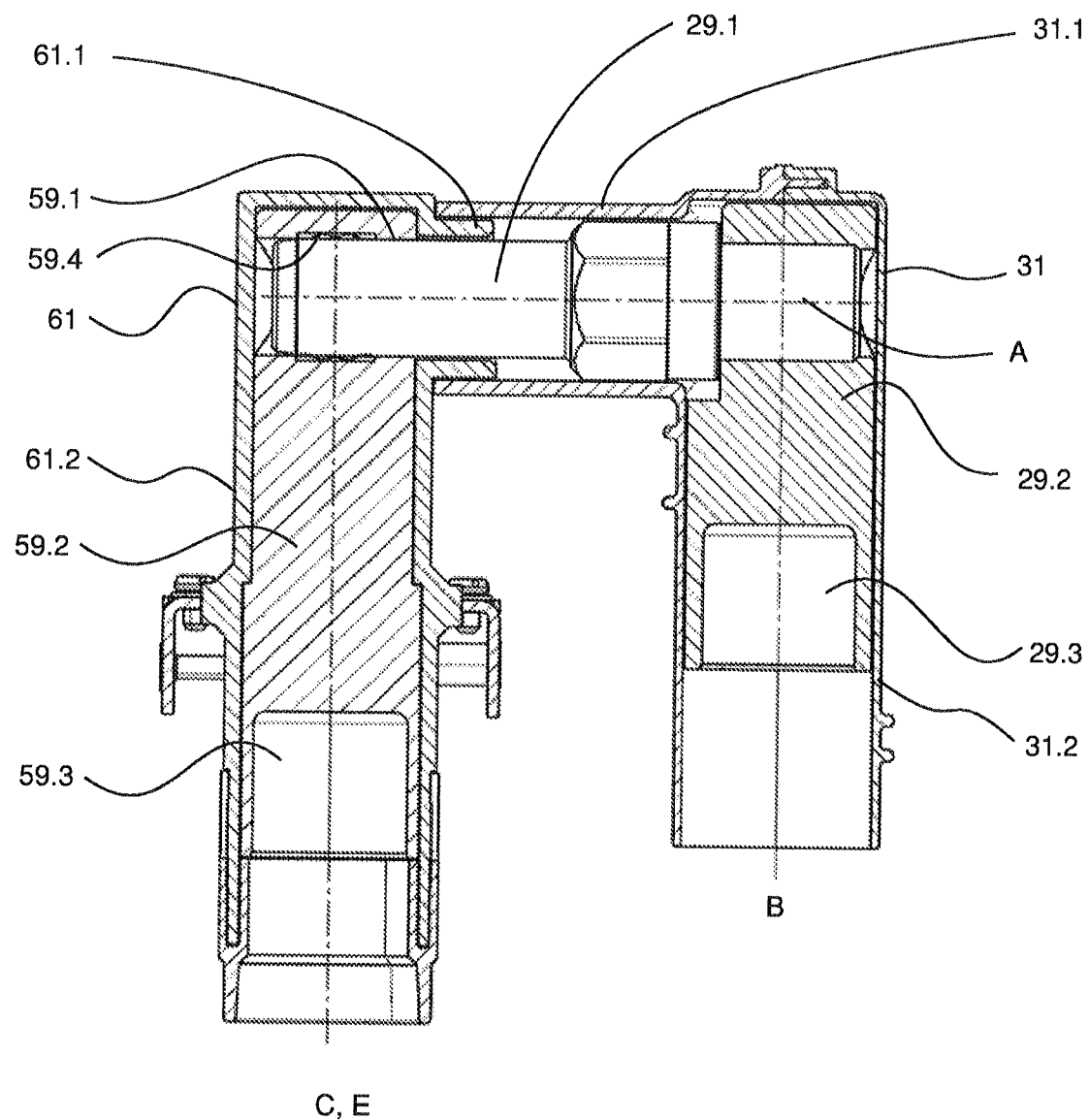
FIG. 5: shows the connection apparatus as in FIG. 3 without the housing of the first and second plug connectors.

FIG. 5 shows the connecting apparatus 1 as shown in FIG. 3, without a representation of the housing 21 and the housing 51, as well as the cable screw connections 22 and 52 for a better overview. For a description of the components refer to the description of FIG. 3.

The advantages of the present invention are immediately apparent: Based on the arrangement of FIG. 4, the first plug connector 20 can be plugged into the second plug connector 50 in the direction A. The contact pin 29.1 is inserted into the contact bush 59.1. By arranging the cable outlet direction B of the first plug connector 20 perpendicularly to the plugging direction A, it becomes immediately apparent that the first plug connector 20 cannot be pulled out of the second plug connector 50 by a pulling action in the direction B, i.e. downwards in the present case. This means that the weight of the cable emanating from the first plug connector in the cable outlet direction B cannot pull the first plug connector 20 from the second plug connector 50. The provisional plug connection thus established can now be locked by establishing the screw connection by means of the locking device 2. During this, the responsible user has both hands free, since the connecting apparatus 1 prevents falling out or pulling out in accordance with the present invention.

At the same time as the contact pin 29.1 is inserted into the contact bush 59.1, the latching arm 58 engages with the latching lug 28 of the holding device 3. This creates additional temporary protection that supports the first plug connector 20 on the second plug connector 50 in the direction B and protects against the removal of the first plug connector 20 by means of the detent 58.1 until a lock is established.

By embodying the first plug connector 20, 20', 20" and 20''' as separate plug connectors, each of the four phases of the power supply can be separately plugged together with the second plug connector 50, which further simplifies handling.

REFERENCE CHARACTER LIST

1 Connecting apparatus
2 Locking device
20, 20', 20", 20''' First plug connector
21, 21', 21", 21''' Housing
22, 22', 22", 22''' Cable screw connection
22.1 External thread
25 Connector edge
26 Locking screw
28 Latching lug
29 Contact element
29.1 Contact pin
29.2 Connecting element
29.3 Crimping region
3 Holding device
31 Insulating body
31.1 Insulating sleeve
31.2 Tubular section
32 Latching
34 Connection opening
5 Holding device
50 Second plug connector
51 Housing
52 Cable screw connection
53 Fixing element
54 Connecting socket
55 Socket edge
56 Seal
57 Threaded bore
58 Latching arm
58.1 Detent
59 Contact element
59.1 Contact bush
59.2 Connecting element
59.3 Crimping region
59.4 Contact ring
60 Coding element
61 Insulating body
61.1 Insulating sleeve
62 Retaining plates
64 Access opening
65 Connection side A Plugging direction
B Cable outlet direction
C Cable outlet direction
E Fastening plane
S Section plane

The invention claimed is:

1. An electrical connecting apparatus for supplying power to coupled cars of rail vehicles with a first plug connector to which at least one cable is connected and a corresponding second plug connector that is provided for attachment to a car wall parallel to a fastening plane (E), wherein the first plug connector and the second plug connector are each provided with one or more corresponding first contact elements or second contact elements configured to be plugged together in a plugging direction (A) and the cable of the first plug connector emanates from the first plug connector in a first cable outlet direction (B), wherein the first cable outlet direction (B) is angled relative to the plugging direction (A), and wherein the plugging direction (A) is angled perpendicularly to the fastening plane (E).

2. The electrical connecting apparatus as claimed in claim 1, the first cable outlet direction (B) is angled perpendicularly to the plugging direction (A).

3. The electrical connecting apparatus as claimed in claim 1, wherein a second cable outlet direction (C) of a cable of the second plug connector is angled relative to the plugging direction (A).

4. The electrical apparatus as claimed in claim 3, wherein the second cable outlet direction (C) is angled perpendicularly to the plugging direction (A).

5. The electrical connecting apparatus as claimed in claim 1, wherein a holding device is provided that supports the first plug connector on the second plug connector against forces acting in the first cable outlet direction (B) when plugged together with the second plug connector in the direction (A).

6. The electrical connecting apparatus as claimed in claim 1, wherein in a plugged-together state of the first plug connector and the second plug connector the first cable outlet direction (B) is oriented parallel to the fastening plane (E) in which the second plug connector is provided for attachment to a car wall.

7. The electrical connecting apparatus as claimed in claim 1, wherein a locking device is provided, with which the first plug connector can be locked to the second plug connector in the plugged-in state.

8. The electrical connecting apparatus as claimed in claim 7, wherein the locking device is embodied as a threaded device, which enables a screw connection of the first plug connector to the second plug connector.

9. The electrical connecting apparatus as claimed in claim 1, wherein the second plug connector is configured for attachment to the car wall in such a way that the plugging direction (A) runs horizontally and the first cable outlet direction (B) is oriented vertically downwards.

10. The electrical connecting apparatus as claimed in claim 1, wherein the second plug connector is embodied as an integral assembly unit configured for connecting a plurality of first plug connectors.

11. The electrical connecting apparatus as claimed in claim 10, wherein a plurality of first plug connectors is provided that can be separately plugged together with and can be locked to the second plug connector.

12. The electrical connecting apparatus as claimed in claim 1, wherein the second plug connector has at least one fastening element configured for attaching the second plug connector to an assembly surface of a car wall.

13. The electrical connecting apparatus as claimed in claim 12, wherein the fastening element comprises an assembly profile with which a housing of the second plug connector can be attached at a distance from the assembly surface.

14. A rail vehicle, comprising at least two coupled cars, wherein each of the two coupled cars is provided with at least one electrical connecting apparatus as claimed in claim 1, wherein on each of the coupled cars a respective second plug connector is fastened to a respective car wall and in each case a first plug connector is plugged together with second plug connectors, wherein the first plug connectors are connected to each other via the connected cable.

\* \* \* \* \*